(12) United States Patent
Bar Yanai et al.

(10) Patent No.: US 10,063,922 B2
(45) Date of Patent: *Aug. 28, 2018

(54) PERFORMANCE METRICS FOR DOWNLOADS OF ENCRYPTED VIDEO

(71) Applicant: VASONA NETWORKS INC., San Jose, CA (US)

(72) Inventors: Roni Bar Yanai, Even Yehuda (IL); Uri Bechar, Tel Aviv (IL); Alex Shapilov, Tel-Aviv (IL)

(73) Assignee: Vasona Networks Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/352,617

(22) Filed: Nov. 16, 2016

(65) Prior Publication Data

US 2017/0070781 A1    Mar. 9, 2017

Related U.S. Application Data

(63) Continuation-in-part of application No. 14/578,579, filed on Dec. 22, 2014.

(Continued)

(51) Int. Cl.
*G06F 15/173* (2006.01)
*H04N 21/442* (2011.01)
(Continued)

(52) U.S. Cl.
CPC ......... *H04N 21/44245* (2013.01); *H04L 1/20* (2013.01); *H04L 43/0894* (2013.01);
(Continued)

(58) Field of Classification Search
CPC .............. H04N 21/44245; H04N 21/44008
(Continued)

(56) References Cited

U.S. PATENT DOCUMENTS 5,699,346 A    12/1997    Vandervort et al.
7,403,623 B2 *  7/2008    Cerf .................. H04L 9/0858
                                                              359/238

(Continued)

FOREIGN PATENT DOCUMENTS

CN    100448284 C    12/2008
WO    2014127832 A1    8/2014

OTHER PUBLICATIONS

European Application # 17192717.1 search report dated Nov. 15, 2017.

(Continued)

*Primary Examiner* — Vivek Srivastava
*Assistant Examiner* — Atta Khan
(74) *Attorney, Agent, or Firm* — D. Kligler IP Services Ltd.

(57) ABSTRACT

Described embodiments include a system that includes a network interface and a processor. The processor is configured to monitor, via the network interface, a streaming of an encrypted video stream, in a sequence of traffic bursts, from a video server to a user terminal, and, based on the monitoring, and without decrypting the video stream, to estimate a bit rate at which the video stream was streamed, and to estimate, using the estimated bit rate, a performance metric of the video stream. Other embodiments are also described.

16 Claims, 5 Drawing Sheets

Related U.S. Application Data

(60) Provisional application No. 62/050,265, filed on Sep. 15, 2014.

(51) Int. Cl.

| | | |
|---|---|---|
| *H04N 21/44* | (2011.01) | |
| *H04N 21/61* | (2011.01) | |
| *H04L 1/20* | (2006.01) | |
| *H04N 21/24* | (2011.01) | |
| *H04L 12/26* | (2006.01) | |
| *H04L 1/16* | (2006.01) | |

(52) U.S. Cl.
CPC ... *H04N 21/2402* (2013.01); *H04N 21/44008* (2013.01); *H04N 21/6175* (2013.01); *H04L 1/16* (2013.01); *H04L 43/062* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 7,496,804 | B2* | 2/2009 | Juncker | H04L 1/201 714/704 |
| 7,782,767 | B1* | 8/2010 | Lin | H04L 29/06027 370/229 |
| 7,958,534 | B1* | 6/2011 | Beser | H04L 12/2801 370/472 |
| 8,521,901 | B2* | 8/2013 | Wason | H04L 47/10 370/230.1 |
| 2006/0095944 | A1 | 5/2006 | Demircin et al. | |
| 2007/0140651 | A1* | 6/2007 | Hashimoto | G11B 27/034 386/291 |
| 2008/0311949 | A1 | 12/2008 | Koskinen et al. | |
| 2010/0011119 | A1* | 1/2010 | Knowlton | H04L 47/10 709/235 |
| 2011/0001833 | A1 | 1/2011 | Grinkemeyer et al. | |
| 2011/0107152 | A1* | 5/2011 | Adams | G06F 11/323 714/43 |
| 2012/0005368 | A1* | 1/2012 | Knittle | H04N 21/23439 709/235 |
| 2012/0311126 | A1* | 12/2012 | Jadallah | H04L 41/5067 709/224 |
| 2012/0324123 | A1* | 12/2012 | Fox | G06F 15/781 709/231 |
| 2013/0078977 | A1* | 3/2013 | Anderson | H04B 1/005 455/418 |
| 2013/0159863 | A1* | 6/2013 | Smith | H04L 41/12 715/734 |
| 2015/0163273 | A1 | 6/2015 | Radcliffe et al. | |
| 2016/0080238 | A1 | 3/2016 | Bar-Yanai et al. | |

OTHER PUBLICATIONS

Dimopoulos et al., "Measuring Video QoE from Encrypted Traffic", Internet Measurement Conference, pp. 513-526, Nov. 14-16, 2016.
Hossfeld et al., "Internet Video Delivery in YouTube: From Traffic Measurements to Quality of Experience", Network and Parallel Computing; LNCS 7754, Springer International Publishing, pp. 264-301, Dec. 31, 2013.
Reed et al., "Leaky streams: Identifying variable bitrate DASH videos streamed over encrypted 802.11n connections", 13th IEEE Annual Consumer Communications & Networking Conference (CCNC), pp. 1107-1112, Jan. 9, 2016.
U.S. Appl. No. 14/578,579 Office Action dated Apr. 6, 2017.
International Application # PCT/US15/37044 Search Report dated Sep. 16, 2015.
U.S. Appl. No. 14/578,579 Office Action dated Sep. 13, 2016.
U.S. Appl. No. 14/578,579 Office Action dated Aug. 10, 2017.
European Application # 15842216.2 search report dated Feb. 15, 2018.
U.S. Appl. No. 14/578,579 office action dated Mar. 8, 2018.

\* cited by examiner

PERFORMANCE METRICS FOR DOWNLOADS OF ENCRYPTED VIDEO

CROSS-REFERENCE TO RELATED APPLICATIONS

The present application is a continuation-in-part of, and claims the benefit of, U.S. patent application Ser. No. 14/578,579, filed Dec. 22, 2014, published as US Patent Application Publication 2016/0080238, which claims the benefit of U.S. Provisional Patent Application 62/050,265, filed Sep. 15, 2014. The disclosures of the aforementioned applications are incorporated herein by reference.

FIELD OF THE INVENTION

The present invention relates generally to communication analysis, and particularly to methods and systems for estimating performance metrics for video streaming.

BACKGROUND

Adaptive Bit-Rate (ABR) is a multimedia streaming technique, in which multimedia content is encoded in advance at several predefined bit rates and divided into segments. The content is streamed to a client, while adaptively selecting the bit rate to be streamed depending, for example, on the communication channel conditions en-route to the client. ABR can be used over various communication protocols, such as Hyper-Text Transfer Protocol (HTTP) and HTTP-Secure (HTTPS).

SUMMARY OF THE INVENTION

There is provided, in accordance with some embodiments of the present invention, a system that includes a network interface and a processor. The processor is configured to monitor, via the network interface, a streaming of an encrypted video stream, in a sequence of traffic bursts, from a video server to a user terminal, and, based on the monitoring, and without decrypting the video stream, to estimate a bit rate at which the video stream was streamed, and to estimate, using the estimated bit rate, a performance metric of the video stream.

In some embodiments, the processor is configured to estimate the performance metric by:

using the estimated bit rate, estimating a volume of data that was contained in a buffer of the user terminal during a playback of the video stream by the user terminal, and estimating the performance metric, based on the estimated volume.

In some embodiments, the processor is configured to estimate the performance metric by identifying a stall in a playback of the video stream by the user terminal.

In some embodiments, the processor is configured to estimate the performance metric by estimating a start delay of a playback of the video stream by the user terminal.

In some embodiments, the processor is configured to estimate the bit rate based on an audio stream that was streamed in parallel to the video stream.

In some embodiments, the processor is configured to estimate the bit rate by:

estimating a duration of audio, belonging to the audio stream, that was downloaded by the user terminal, estimating a volume of data, belonging to the video stream, that was downloaded by the user terminal, and estimating the bit rate, by dividing the volume of data by the duration of audio.

In some embodiments, the processor is configured to estimate the bit rate by:

ascertaining a duration between a first message sent from the user terminal to the video server and a second message sent from the user terminal to the video server, estimating a data volume of the video stream that was downloaded by the user terminal between the sending of the first message and the sending of the second message, and estimating the bit rate by dividing the estimated data volume by the duration between the first message and the second message.

In some embodiments, the processor is configured to estimate the data volume downloaded by the user terminal based on a difference between:

a second Transmission Control Protocol (TCP) acknowledgement number, sent by the user terminal to the video server in the second message, and a first TCP acknowledgement number, sent by the user terminal to the video server in the first message.

In some embodiments, the processor is configured to estimate the data volume based on a volume of data, belonging to the video stream, that was streamed between the sending of the first message and the sending of the second message.

In some embodiments, the processor is further configured to select the first message and the second message for the estimating of the bit rate, in response to ascertaining that respective payloads are contained in the first message and the second message.

There is further provided, in accordance with some embodiments of the present invention, a method that includes monitoring a streaming of an encrypted video stream, in a sequence of traffic bursts, from a video server to a user terminal. The method further includes, based on the monitoring, and without decrypting the video stream, estimating a bit rate at which the video stream was streamed, and, using the estimated bit rate, estimating a performance metric of the video stream.

The present invention will be more fully understood from the following detailed description of embodiments thereof, taken together with the drawings, in which:

DETAILED DESCRIPTION OF EMBODIMENTS

Overview

Figure 1:
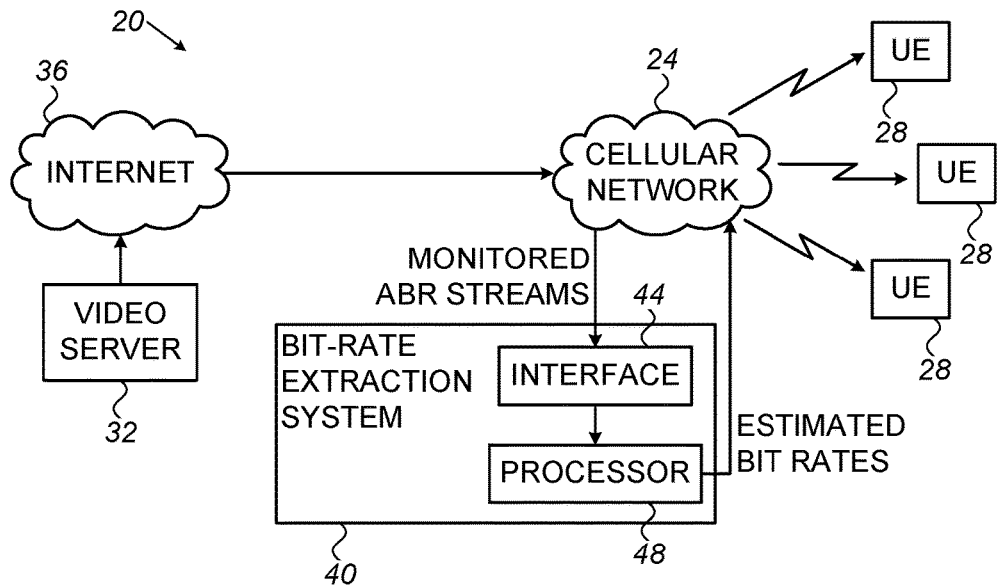
FIG. 1 is a block diagram that schematically illustrates a communication network that uses video bit-rate extraction, in accordance with an embodiment of the present invention.

Embodiments described herein include systems and methods for estimating performance metrics for an ABR video stream. Typically, a media bit-rate of the streaming is first estimated, and the estimated media bit-rate is then used to derive the performance metrics. For example, based on the estimated media bit-rate, a processor may "model" or "simulate" the buffer of the client during the streaming, i.e., the processor may estimate the time-varying volume of the data within the buffer. This allows the processor to identify, for example, any stalls in the playback of the video, the start delay of the playback, and/or any other relevant performance metrics. Such performance metrics may be used, for example, by an operator of a cellular communication network to better allocate bandwidth among clients or for applying various Quality-of-Service (QoS) policies.

In this context, it is important to distinguish between media bit-rate and communication bit-rate. The term "media bit-rate" refers to the bit-rate of the actual media (e.g., video) content that is provided to the client. Generally, high media bit-rate corresponds to high media quality, and vice versa. The terms "communication bit-rate" or "traffic bit-rate" refers to the bit-rate of the communication traffic that carries the media. The communication bit-rate is not directly related to the media bit-rate. For example, for a given media bit-rate, the communication bit-rate may vary depending on the conditions of the communication channel to the client. (In general, as used hereinbelow, the term "bit rate" generally refers to the media bit-rate.)

In some cases it is simple to extract the media bit-rate from the traffic. In many practical cases, however, a third party cannot measure the media bit-rate directly, e.g., because the video content is not accessible. For example, in many cases the video stream is encrypted and cannot be decoded by third parties. A common use case of this sort is Adaptive Bit-Rate (ABR) video transferred over HTTP-Secure (HTTPS).

Embodiments of the present invention that are described herein provide improved methods and systems for estimating the media bit-rate of multimedia streams. In some embodiments, a bit-rate extraction system monitors media streams, e.g., ABR streams, and estimates their media bit-rates without decoding or otherwise accessing the actual video content. In some embodiments the system estimates the media bit-rates by analyzing the characteristic traffic pattern of ABS streaming.

In ABR, the video content is encoded in advance at several media bit-rates, and segmented into segments of constant playback time (playback duration). The video is streamed to a client segment-by-segment, at a media bit-rate that can be chosen to match the client capabilities or channel conditions. The communication traffic carrying an ABR stream has a characteristic initial buffering phase, followed by a steady-state sequence of traffic bursts.

In some embodiments, the system identifies an ABR stream by detecting the above-described traffic pattern, distinguishes between the individual traffic bursts, estimates the data volumes in one or more of the traffic bursts, and derives the media bit-rate of the ABR stream from the estimated data volumes.

Several implementation examples and variations of the disclosed techniques are described below, such as methods for distinguishing between traffic bursts, and for distinguishing between the buffering phase and steady-state phase.

In a typical ABR session, the client requests each new segment by sending a GET message to the video server. In some embodiments, the system identifies such GET messages, and then uses these messages to estimate the media bit-rate. For example, the system may estimate the volume of data that was downloaded by the client between two GET messages, and then estimate the media bit-rate by dividing the estimated data volume by the duration between the sending or receipt of these messages. To estimate the volume of data, the system may compute the difference between the respective Transmission Control Protocol (TCP) acknowledgement numbers contained in the two GET messages.

In some cases, the video bit rate may not be estimable solely from the video streaming itself. In such cases, a parallel audio streaming may provide information that may be used to estimate the video bit rate.

It is emphasized that the disclosed techniques extract the media bit-rates of ABR video streams without any sort of access or decoding of the video content. As such, these techniques are able to measure the media bit-rates even when the video stream, including both content, metadata and signaling, is encrypted.

Although the embodiments described herein refer mainly to ABR streams, the disclosed techniques are applicable to non-ABR streams, as well; in particular, techniques described herein are applicable to any streaming in which video (and/or other content) is streamed in discrete bursts of traffic. Although the embodiments described herein refer mainly to video streaming, the disclosed techniques are applicable to other types of multimedia streams, such as audio streams.

System Description

FIG. 1 is a block diagram that schematically illustrates a communication network 20 that uses video bit-rate extraction, in accordance with an embodiment of the present invention. In network 20, a cellular communication network 24 serves multiple user terminals referred to as User Equipment (UEs) 28. The UEs may comprise, for example, cellular phones or mobile computing devices.

Among other communication services, network 24 transfers ABR video streams to UEs 28, to be displayed to users. In the description that follows, the terms "UE," "terminal," "client" and "user" are used interchangeably. In the present example, the ABR video streams are streamed from a video server 32, across a network 36 such as the Internet, and over cellular network 24 to the clients. The video server may comprise, for example, a Web-site such as YouTube or Netflix that provides video streaming.

At least some of the ABR video streams are encrypted, e.g., transferred over HTTPS. In such cases, the entire stream, including video content, metadata and bidirectional signaling, is encrypted. Because of the encryption, a given ABR stream is inaccessible to third parties other than video server 32 and the intended UE 28. A third party may comprise, for example, the service provider or operator of cellular network 24.

In some embodiments, a bit-rate extraction system 40 estimates the media bit-rates of ABR video streams transferred over network 24, even though the video streams are inaccessible due to encryption. In the present example, system 40 is operated by the operator of network 24, who uses the estimated media bit-rates for assessing and acting upon the video quality experienced by various users. Alternatively, however, system 40 can be operated by any other suitable party for any other suitable use.

In the embodiment of FIG. 1, system 40 comprises a network interface 44 (such as a network interface card) and a processor 48. Processor 48 configured to monitor, via interface 44, some or all of the video streams transferred over network 24. Processor 48 is further configured to carry out the bit-rate estimation methods described herein, and possibly act upon the estimated bit-rates.

The configurations of network 20 and system 40 shown in FIG. 1 are example configurations, which are chosen purely for the sake of conceptual clarity. In alternative embodiments, any other suitable configuration can be used for network 20 and/or bit-rate extraction system 40. The different elements of system 40 may be implemented using suitable hardware, e.g., using one or more Application-Specific Integrated Circuits (ASICs) or Field-Programmable Gate Arrays (FPGAs), using software, or using a combination of hardware and software elements.

In some embodiments, processor 48 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Bit-Rate Estimation for Encrypted ABR Streams

In a typical ABR implementation, the video content is encoded in advance at several predefined media bit-rates. Each replica of the video content is then segmented into a sequence of segments having a constant playback time (or playback duration), and stored in the video server. A selected replica, having a media bit-rate that matches the client and/or communication channel, is streamed from the video server to the client. The segment edges are typically synchronized among the different replicas, so that it is possible to switch from one replica to another (i.e., from one media bit-rate to another) seamlessly during playback.

In an example embodiment, the video is encoded at three media bit-rates—300 Kbps, 800 Kbps and 1.2 Mbps. Typical segment lengths are between two and ten seconds. Alternatively, however, any other suitable bit-rates and segment lengths can be used.

When an ABR stream is streamed over network 24, e.g., over HTTPS, the resulting communication traffic has a characteristic temporal pattern.

Figure 2:
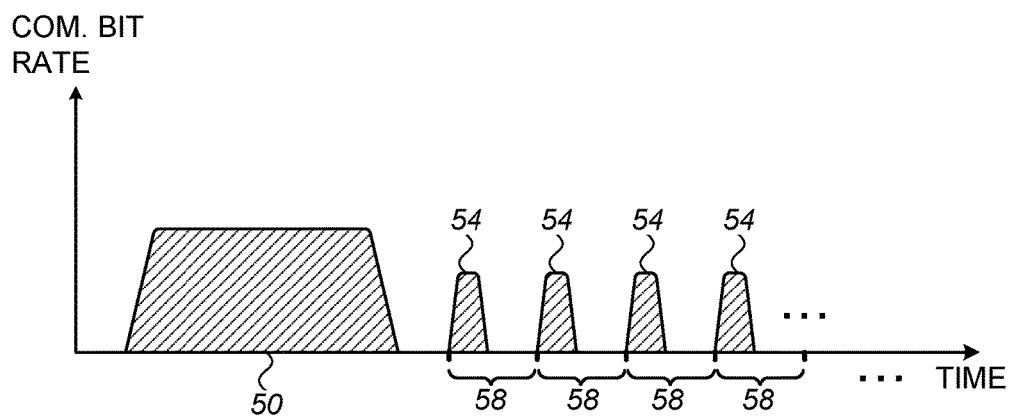
FIG. 2 is a graph showing a characteristic traffic pattern of an Adaptive Bit-Rate (ABR) video stream, in accordance with an embodiment of the present invention.

FIG. 2 is a graph showing the characteristic temporal traffic pattern of ABR video stream, in accordance with an embodiment of the present invention. The graph illustrates the communication bit-rate as a function of time. As explained above, the observable bit-rate is the communication bit-rate, which is not directly related to the media bit-rate.

An ABR session typically begins with an initial phase 50, which is referred to as a buffering phase. In the buffering phase, the client typically requests several segments consecutively, in order to initially fill its buffer and decide on the appropriate steady-state media bit-rate. Therefore, the buffering phase is typically characterized by a long initial traffic burst.

After initially filling its buffer and choosing the appropriate media bit-rate, the client typically requests one segment at a time. The client typically requests a new segment when its buffer reaches a certain low threshold. This ongoing process is referred to as a steady-state phase, and is characterized by a sequence of traffic bursts 54. Successive traffic bursts 54 are separated by idle periods. The time between successive traffic bursts (i.e., the duration of each time segment 58 marked in the figure) is equal to the constant playback time of the video segments.

Changes of media bit-rate during the steady-state phase are usually rare, because the rate switch is noticeable by the user. The client will therefore typically attempt to choose the best-performing media bit-rate during the buffering phase, and keep the media bit-rate constant during the steady-state phase.

Nevertheless, the media bit-rate in a given stream may change during the steady-state phase, for example in response to changes in the communication channel relative to the buffering phase. The techniques described herein are applicable regardless of whether the media bit-rate is constant, changes rarely or changes frequently during the steady-state phase.

In some embodiments, processor 48 of system 40 identifies the above-described traffic pattern of the ABR stream, and estimates the media bit-rate of the stream based on the pattern. In an embodiment, processor 48 measures the respective data volumes contained in one or more traffic bursts 54, and derives the media bit-rate from the measured data volumes.

If the number of bits in a traffic burst is X bytes, and the video segment playback time is T seconds, then the media bit-rate is BR=<X·8/T> bits/second (bps). The < > operator denotes averaging over multiple traffic bursts. Thus, processor 48 may measure the number of bytes in a traffic burst (X) over several traffic bursts 54, and calculate BR using the known value of T.

In order to perform the calculation above, processor 48 should typically distinguish between consecutive traffic bursts, e.g., by identifying the start times of segments 58. In a typical ABR session, the client requests each new segment by sending a GET message to video server 32.

It is possible in principle to identify the GET messages and define the time of each GET message as the start time of a new segment. When the ABR stream is encrypted, however, the GET messages are also encrypted and cannot be decoded by system 40. Thus, in some embodiments, processor 48 interprets all upstream messages (messages from the client to the video server) as GET messages, and defines the interval between successive upstream messages as a respective segment. Alternatively, since each GET message contains a payload (or "payload data"), whereas at least some other types of upstream messages (e.g., TCP acknowledge messages) do not, the processor may identify the GET messages in response to ascertaining that respective payloads are contained in these messages. (TCP-based protocols typically allow for identifying such payloads, even if the transmitted packets are encrypted.)

In these embodiments, processor 48 measures the data volume between successive upstream messages, and treats this data volume as the data volume of a respective traffic burst 54. In alternative embodiments, processor 48 may distinguish between segments, and thus between traffic bursts, in any other suitable way. For example, the processor may identify the idle periods between bursts.

In some embodiments, processor 48 identifies buffering phase 50, as well, using the upstream GET messages. In an example embodiment, the processor may identify several GET messages (or simply several upstream messages) with little or no idle time between them. Such a pattern is highly indicative of the initial buffering phase.

When evaluating the media bit-rate using the BR=<X·8/T> relation, it is important to verify that the traffic bursts being averaged all have the same media bit-rate. Otherwise, e.g., if the media bit-rate has changed during the averaging period, the estimation is likely to be erroneous. In some embodiments, processor 48 avoids this situation by verifying that the data volumes in the bursts being averaged differ from one another by no more than a predefined difference. If this condition is not met, the processor may choose a different set of bursts for estimating the media bit-rate.

Typically, video server 32 uses a relatively small set of known predefined media bit-rates from which the client can select, e.g., three or four rates. This information can be used by processor 48 to improve performance. For example, after measuring the average data volume per traffic burst, processor 48 may choose the predefined media bit-rate that best matches the average data volume, from among the predefined media bit-rates in the set.

In some embodiments, processor 48 assesses the media bit-rate by assessing the data volumes during the steady-state phase. For example, it may be known (at least for a particular client type and a particular server) that the client always requests N segments in the buffering phase. Using this information, processor 48 may measure the data volume during the entire buffering phase and derive the media bit-rate from this measurement.

Typically, processor 48 estimates the media bit-rate separately per traffic burst. Evaluating the burst-by-burst behavior of the media stream enables processor 48 to calculate various metrics of interest. One example metric is the start delay—The time that elapses from the time the user sends the initial request to view the stream until the first image frame is displayed on the UE. The start delay can be derived, for example, from the buffering phase, or it can be calculated heuristically. For example, processor 48 may estimate the length of time needed for downloading ten seconds of content (or any other suitable playback duration), under an assumption that this content size is the size needed to start playing the stream.

Another metric of interest, which can be assessed from the burst-by-burst behavior of the streams, is the occurrence of stalls or freezes. A stall occurs when the UE is unable to download sufficient content to play back. For example, if thirty seconds have elapsed but the UE downloaded content for a playback duration of only 29.5 seconds, then a stall would occur. In this example, the thirty-second duration can be measured directly, and the 29.5-second duration can be inferred by processor 48 from the traffic bursts and respective bitrates.

Yet another metric of interest is the lengths of the stalls. Once a stall occurs, the streaming typically reverts back to the buffering phase. At this point, the same measurement of start Delay can be used by processor 48 to measure the length of the stall.

Alternatively, processor 48 may estimate various other suitable performance metrics of the media stream based on the estimated data volumes (and thus the media bit-rates) of the respective traffic bursts.

It should also be noted that the streaming pattern of FIG. 2 is typical of a non-congested network. In practice, the streaming process encounters congestion in network 36 and/or 24. In some embodiments, processor 48 is able to estimate the media bit-rate in the presence of congestion, as well. Such estimation is typically based on the knowledge of T, the video segment playback time used by video server 32.

In some embodiments processor 48 may measure T, as explained above, during non-congested periods, and apply the measured T during congestion. Alternatively, processor 48 may assume typical values of T that are known to be used by a particular service (e.g., YouTube). Since each traffic burst is downloaded between two consecutive GET messages (and often each traffic burst occurs on a different TCP connection), it is possible for processor 48 to calculate the media bit-rate under congestion from T.

Figure 3:
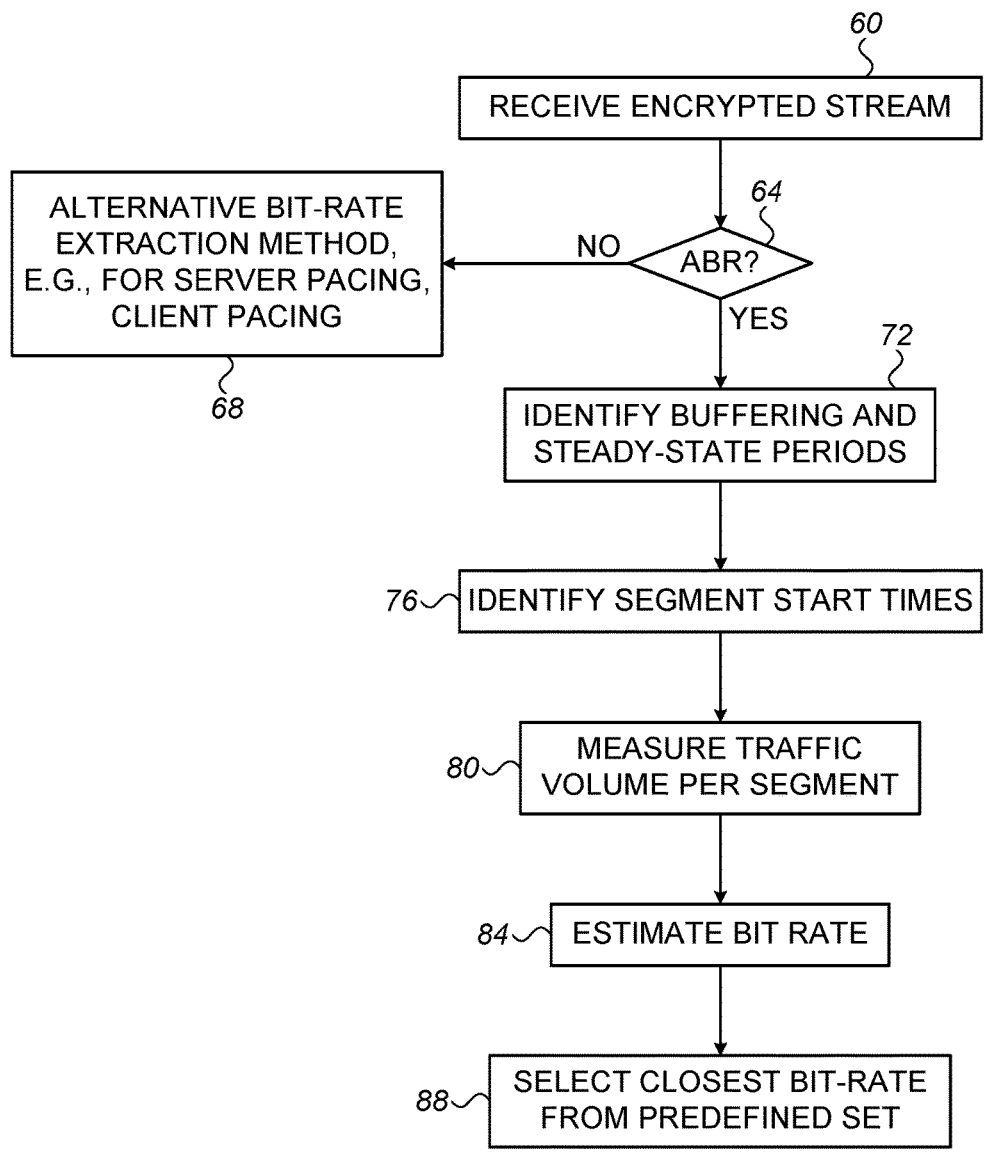
FIG. 3 is a flow chart that schematically illustrates a method for bit-rate extraction, in accordance with an embodiment of the present invention.

FIG. 3 is a flow chart that schematically illustrates a method for bit-rate extraction, in accordance with an embodiment of the present invention. The method begins with interface 44 of system 40 receiving an encrypted video stream, at an input step 60. (The description of FIG. 3 refers to a single stream for the sake of clarity. In real life, system 40 typically processes multiple streams in parallel.)

Processor 48 of system 40 checks whether the stream is an ABR video stream, at an ABR verification step 64. The processor may use the characteristic temporal pattern described above for this purpose. If the stream is not an ABR stream, processor 48 reverts to an alternative media bit-rate estimation method, at an alternative estimation step 68. Such alternative method may apply, for example, to client pacing or server pacing streaming modes.

If step 64 concludes that the monitored stream is indeed an ABR video stream, processor 48 proceeds to estimate the media bit-rate of the stream using the disclosed techniques. At a phase identification step 72, processor 48 distinguishes between the buffering phase and the steady-state phase. The processor then identifies the start times of segments 58 of the steady-state phase, at a segment identification step 76. At a data measurement step 80, processor 48 measures the data volume contained in each of one or more of traffic bursts 54.

Processor 48 then estimates the media bit-rate of the ABR stream based on the data volumes of the respective traffic bursts, at a bit-rate derivation step 84. At a selection step 88, processor 48 selects one of the predefined media bit-rates supported by server 32 that is closest to the media bit-rate estimated at step 84. In some embodiments, steps 84 and 88 can be combined, e.g., by using a direct mapping of data volume per burst to media bit-rate.

Figure 4A:
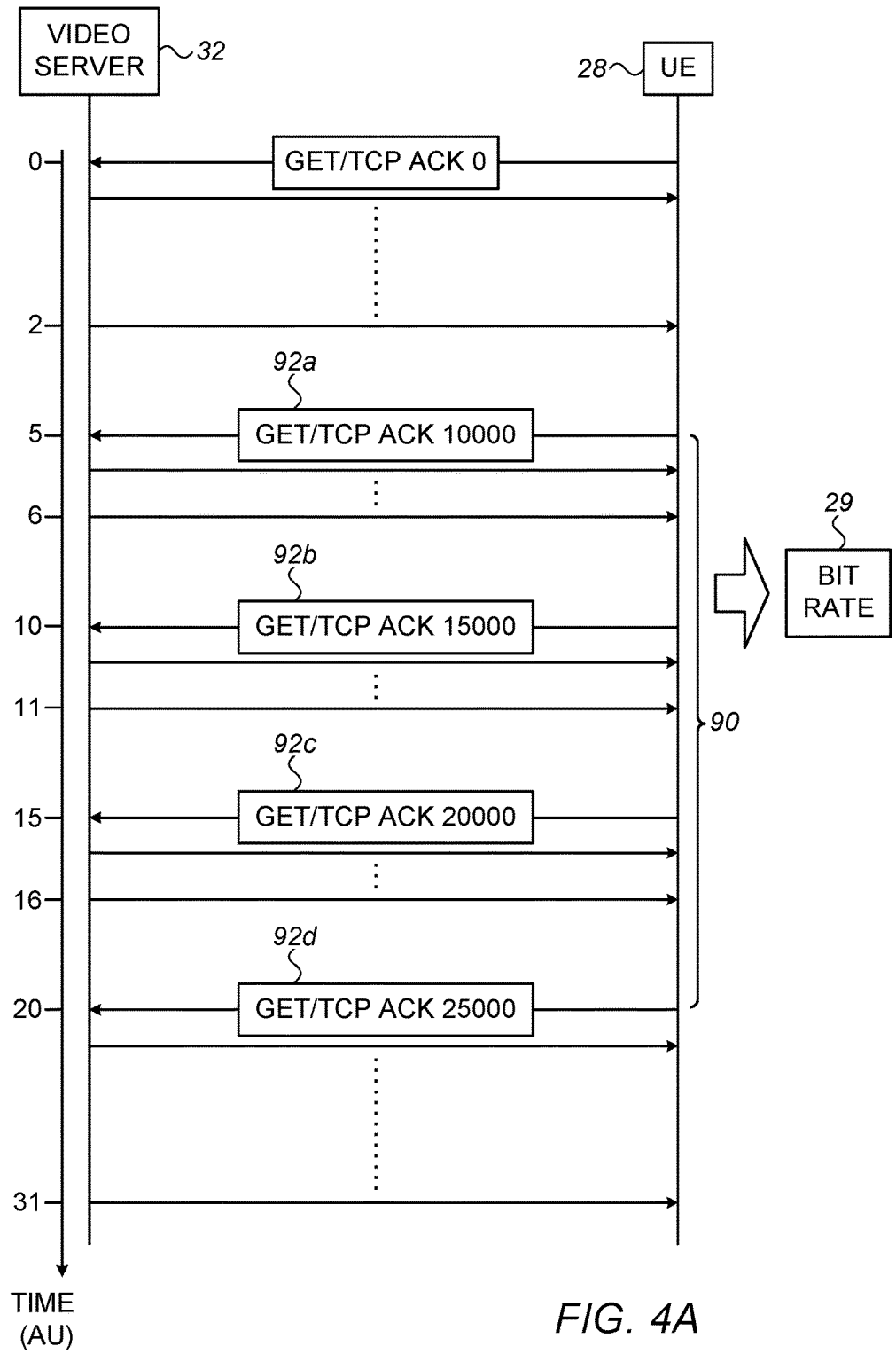
FIG. 4A is a schematic illustration of a method for estimating a media bit-rate, in accordance with some embodiments of the present invention.

Reference is now made to FIG. 4A, which is a schematic illustration of a method for estimating a media bit-rate, in accordance with some embodiments of the present invention. FIG. 4A depicts a streaming of a video, over a period of time, from video server 32 to UE 28. In FIG. 4A, the vertical time axis marks a plurality of times during the period of time, these times being expressed in arbitrary units (AU). The description below uses the notation "t=*" to indicate a particular time; for example, a time of 10 AU is expressed as "t=10."

In FIG. 4A, it is assumed that (i) communication between the video server and the UE is in accordance with the Transmission Control Protocol (TCP), and (ii) the video stream is divided into segments of equal playback time T. For example, the video streaming may use the HTTP Live Streaming (HLS) protocol. In protocols such as HLS, the UE transmits a GET message, requesting a new segment of video, whenever (i) the volume of data within the UE buffer is at or below a particular threshold, and (ii) the most-recently requested segment of video has been received in its entirety. Thus, as described above with reference to FIG. 2, during the steady-state phase, the time between successive traffic bursts—or equivalently, the time between successive GET messages—is equal to the constant playback time of the video segments. (In the context of the present application, including the claims, the term "volume of data" may be expressed in bits, bytes, or other unit of data measure, or may be expressed as a duration of playback time, in units of time such as seconds.)

First, at t=0, UE 28 transmits an initial GET message to the video server. This GET message, and each subsequent GET message, includes a TCP acknowledgement ("TCP ACK") number. In general, the TCP ACK number tracks the number of bytes in the stream that have been downloaded, such that, as the UE continues to download the video stream, the UE increments the TCP ACK number by the number of newly-downloaded bytes. (In practice, the initial TCP ACK number is usually not zero; for simplicity, however, a zero value is assumed in FIG. 4A.)

Video server 32 receives the initial GET message, and begins to stream the video to the UE, as indicated by the rightward-pointing arrows that follow t=0. This initial stream includes the initial traffic burst of buffering phase 50 (FIG. 2). (As described above, the buffering phase may include additional GET messages from the UE, which are not shown in the figure.) Sometime before t=5, the UE begins to play the video.

Beginning at t=5, the steady-state phase 90 begins. During steady-state phase 90, the UE transmits GET messages to the video server at a constant interval of 5 AU, and the video server responds to each GET message by streaming, in a traffic burst, a 5 AU segment of video to the UE. (Thus, the interval between GET messages—5 AU—is equal to T, the playback time of each segment of video.) The steady-state phase continues until t=20. At t=20, network problems begin, such that, as further described below with reference to FIG. 4B, the playback of the video is stalled. The video streaming may then re-enter steady state and continue for any duration of time, or the user may terminate the download.

Following the streaming of the video, processor 48 processes the monitored stream. First, processor 48 identifies steady-state phase 90, by identifying the constant duration of 5 AU between successive GET messages. The processor then analyzes steady-state phase 90, and estimates the media bit-rate in response thereto. In particular, the processor may estimate the media bit-rate by dividing the data volume of the video stream that was received (i.e., downloaded) between two GET messages by the duration between the two GET messages (i.e., the duration between the sending or receipt of the two GET messages). For example, in FIG. 4A, the duration between GET message 92a (at t=5) and GET message 92b (at t=10) is 5 AU. In GET message 92b, TCP ACK has a value of 15000 bytes, which is 5000 bytes, and hence 40000 bits, greater than the TCP ACK value in GET message 92a. The processor may thus divide 40000 by 5 to arrive at an estimated bit rate of 8000 bits/AU. The processor may similarly estimate another bit rate based on the interval between GET message 92b and GET message 92c (at t=15), and another bit rate based on the interval between GET message 92c and GET message 92d (at t=20). The processor may then average the three bit rates, to help cancel any measurement error.

Alternatively, the processor may divide the data volume of the video stream received by the UE between GET message 92a and GET message 92d by the total duration between these two GET messages. The first quantity, as indicated by the TCP ACK value of 25000 in GET message 92d, is 15000 bytes, i.e., 120000 bits, while the second quantity is 15 AU. The processor may thus divide 120000 by 15 to arrive at an estimated bit rate of 8000 bits/AU.

In effect, the technique described immediately above is similar to the application of the BR=<X·8/T> formula described earlier. An important difference, however, is that the technique described immediately above estimates the data volume of received traffic based on the TCP ACK number, and uses this estimated data volume in place of "X," which is the number of bytes in the traffic burst(s). An advantage of doing so is that the TCP ACK number takes into account only those packets that were received by the UE; "X," on the other hand, includes packets that were dropped and subsequently retransmitted. In other words, when using "X," it is more likely that the media bit-rate will be overestimated, relative to when using the TCP-ACK-based estimated data volume.

Figure 4B:
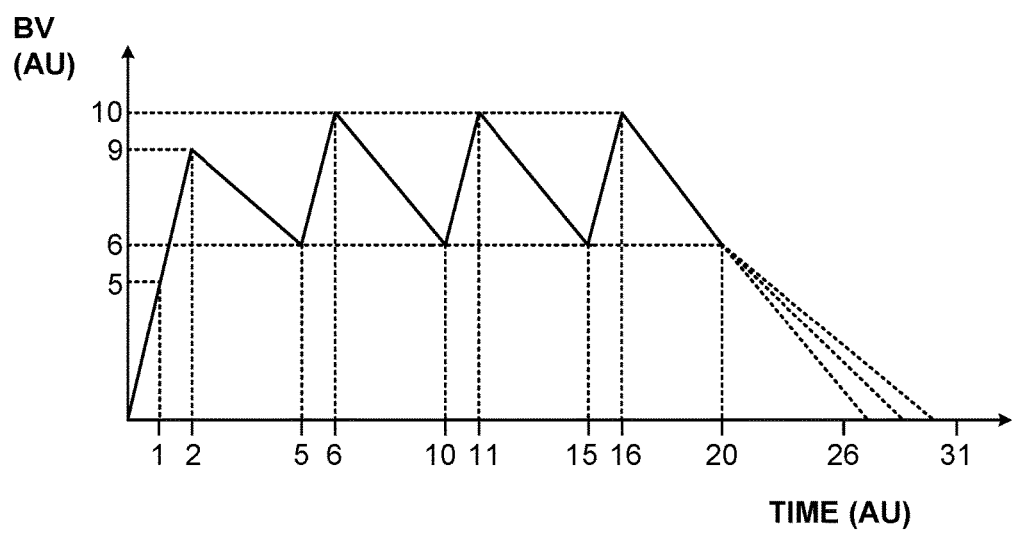
FIG. 4B is a schematic illustration of an estimation of a volume of data within a buffer, in accordance with some embodiments of the present invention.

Reference is now made to FIG. 4B, which is a schematic illustration of an estimation of a volume of data within a buffer ("BV"), in accordance with some embodiments of the present invention.

Further to estimating the media bit-rate, as described above, the processor estimates the volume of data that was contained in the buffer of the user terminal during the playback. For example, the processor may estimate, for a plurality of instances of time during the playback, the duration of the video that was contained in the buffer. FIG. 4B shows such an estimation for the scenario shown in FIG. 4A. In particular:

(i) Between t=0 and t=2, the initial segment of video was received by the UE. Given that the TCP ACK number at t=5 indicates that this initial segment contained 80000 bits, and given the estimated media bit-rate of 8000 bits/AU, the processor infers that between t=0 and t=2, the UE received 10 AU of video. As indicated in FIG. 4B, the processor may assume that these 10 AU of video were received at a constant throughput of 5 AU/AU, i.e., 5 AU of video per AU of time. Alternatively, the processor may estimate a time-changing throughput at which the 10 AU of video were downloaded, based on the observed transmitted data volumes. For example, if 60% of the initial traffic burst was transmitted between t=0 and t=1, and 40% between t=1 and t=2, the processor may assume that 6 AU were received by the UE between t=0 and t=1, and 4 AU between t=1 and t=2. (The remainder of the description of FIG. 4B will assume a constant throughput for each burst of traffic.)

(ii) The processor further ascertains (as further described below) that the UE began playback upon the buffer data volume reaching 5 AU. Consequently, given the assumed throughput of 5 AU/AU, the processor estimates a playback start delay of 1 AU. Following this start delay, between t=1 and t=2, the UE played 1 AU of video, such that the buffer data volume at t=2 was 9 AU. The processor further assumes that between t=2 and t=5, the UE played 3 AU of video, bringing the buffer data volume down to 6 AU. (In light of the GET message at t=5, 6 AU may be assumed to be the threshold buffer data volume at or below which the UE requests the next 5 AU video segment from the video server, assuming that the most-recently requested video segment was received in its entirety.)

(iii) The processor then simulates the buffer data volume during steady state. During each interval of steady state, the buffer data volume is assumed to have risen to 10 AU during the first 1 AU of the interval, and to have then fallen back to 6 AU.

(iv) Given the estimated buffer data volume of 6 AU at t=20, and the absence of a GET message between t=20 and t=31, the processor identifies that a stall in the playback occurred sometime between t=26 and t=31, due to a decrease in the throughput of the download, or a complete interruption to the download. (The stall could not have occurred prior to t=26, since 6 AU of video were in the buffer at t=20. The stall could not have occurred later than t=31, since the absence of a GET message between t=20 and t=31 indicates that less than 5 AU were received between t=20 and t=31.)

The processor may more precisely identify the time of occurrence of the stall, based on the volume of traffic transmitted after t=20.

In some embodiments, the processor estimates the buffer data volume in data units (such as bytes), alternatively or additionally to estimating the buffer data volume in units of time. Since the processor estimates the media bit-rate, as described above, the processor may easily convert between the two data-volume measures.

Typically, the minimum buffer data volume required to begin playback is application-dependent. The processor may therefore learn the minimum buffer data volume for various applications. Subsequently, upon identifying the application with which the monitored video stream is associated, the processor may ascertain the minimum buffer data volume required for playback of the video stream, and hence, estimate the start delay, as described above with reference to FIG. 4B. (Typically, the application with which the video stream is associated may be identified, even if the video stream is encrypted.)

Alternatively, instead of precisely ascertaining the minimum buffer data volume, the processor may estimate the minimum buffer data volume. Although the estimate of the start delay, and of the timing of any stalls, may be less accurate in such a case, the processor may nevertheless identify the occurrence of most stalls.

Hence, by monitoring the streaming as described above, the processor may estimate at least three important performance metrics: the start delay, the stall frequency, and the throughput in units of "duration of video per time." The processor may also estimate the duration of any particular stall, based on, for example, (i) the time at which the stall was estimated to have begun, and (ii) the time at which a subsequent re-buffering is estimated to have ended. For example, with reference to FIG. 4B, the processor may estimate, based on the volume of traffic seen subsequently to t=20, that between t=20 and t=29, the UE received only 3 AU of video; this implies that a stall began at t=29. The processor may further observe a GET message at t=32, which indicates that between t=29 and t=32, the UE received the remaining 2 AU of the 5 AU segment that was requested at t=20. (These 2 AU of video were not played, however, until the re-buffering was completed.) The processor may further estimate, based on the volume of traffic seen subsequently to t=32, that 4 AU of video were downloaded between t=32 and t=33. Given the assumed threshold buffer data volume of 6 AU, this implies that the re-buffering ended, and therefore playback restarted, at t=33. Thus, the estimated duration of the stall is 4 AU (33−29).

Based on the respective estimated durations of any stalls, the processor may compute statistics for the stall durations, such as an average stall duration.

For protocols that are not TCP-based, such as the Quick UDP Internet Connection (QUIC) protocol (used, for example, by the YouTube application, in some cases), and/or that do not divide the video stream into segments of equal playback time, impediments to using the above-described techniques may include one or more of the following:

(i) Payloads may not be identifiable, such that GET messages may not be as easily distinguished from other upstream messages.

(ii) TCP ACK numbers may not be available for estimating the data volume of downloaded video.

(iii) If the video segments are not of equal duration (and hence, the GET messages are inconsistently spaced), there may be no steady-state phase that lends itself to estimating the media bit-rate.

Therefore, for some protocols, other techniques are used to estimate the buffer data volume over the streaming period. Such techniques take advantage of the fact that the audio for the video is streamed separately from, and in parallel to, the video stream, at a constant bit rate that is selected from a small number of predefined options. As further described below, this audio stream may be used to infer the bit rate of the video stream.

Figure 5:
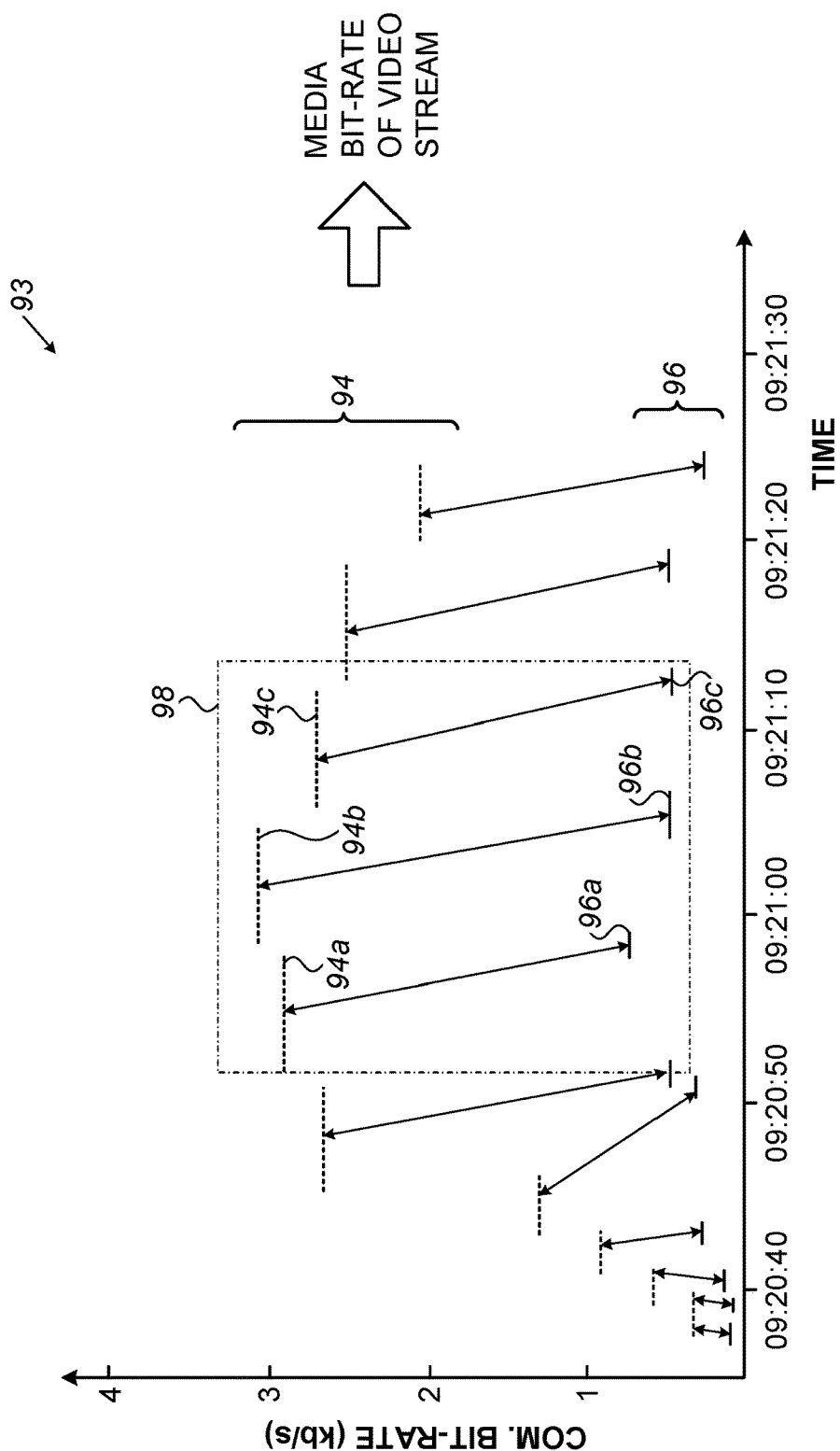
FIG. 5 is a schematic illustration of a graph showing a characteristic traffic pattern that does not exhibit a steady-state phase, from which a media bit-rate may nonetheless be derived, in accordance with some embodiments of the present invention.

In this regard, reference is now made to FIG. 5, which is a schematic illustration of a graph 93 showing a characteristic traffic pattern that does not exhibit a steady-state phase, from which a media bit-rate may nonetheless be derived, in accordance with some embodiments of the present invention. (Graph 93 is based on an actual streaming that was observed.) The traffic pattern shown in graph 93 includes a video stream, which includes a plurality of bursts 94 of video traffic (marked as dashed lines), and an audio stream, which includes a plurality of bursts 96 of audio traffic (marked as solid lines). The horizontal axis of graph 93 marks the respective times at which the bursts were streamed, while the vertical axis of graph 93 marks the respective communication ("com.") bit-rates of the bursts. Typically, no more than one video burst, and no more than one audio burst, is streamed at any particular time. (The appearance of overlapping bursts of the same type in FIG. 5 is due to measurement error.)

In embodiments of the present invention, processor 48 is configured to identify a pattern such as that which is shown in graph 93, and to then estimate the media bit-rate of the video stream, based on the pattern. Typically, to identify the pattern, processor 48 first identifies the respective beginnings and ends of the bursts, based on GET messages identified in the traffic. (As opposed to the relatively large separation between bursts shown in FIG. 2, the separation between bursts in FIG. 5 is relatively small, as is typical for protocols such as QUIC, such that it may not be possible to distinguish between bursts without identifying the GET messages.) In particular, each GET message marks the beginning of a new burst, and also indicates that the previous burst (belonging to the same flow as the new burst) ended before the GET message, at the time at which the last packet belonging to the previous burst was streamed. Hence, the identified GET messages may be used to divide each of the audio and video streams into discrete bursts.

For protocols such as QUIC in which payloads are not identifiable, the processor typically identifies the GET messages by their size. For example, the processor may compare the size of each upstream message to a threshold, and only those upstream messages whose size exceeds the threshold are identified as GET messages.

Following the identification of the bursts, the processor typically applies a machine-learned classifier to the identified bursts, in order to classify each burst as a video burst or an audio burst. Such a classification may be based on any relevant features of the bursts. In one example embodiment, such features include, for each given burst, (i) the number of bytes in the previous burst, (ii) the duration of the previous burst, (iii) the number of bytes in the given burst, (iv) the duration of the given burst, and (v) the duration between the start of the previous burst and the start of the given burst. The classifier may be learned using a deep neural network algorithm, or using any other suitable machine-learning algorithm.

Following the identification of the bursts, the processor estimates the media bit-rate of the video stream, as described in detail below. The estimation is based on the one-to-one correspondence between the video bursts and audio bursts, as indicated in FIG. 5 by the double-sided arrows; for every video burst 94, there is a corresponding (or "parallel") audio burst 96, of the same playback duration, which contains the audio that is to be played back together with the video contained in the video burst. The corresponding audio burst, for each video burst, is the audio burst having the same relative position as that of the video burst. For example, in the example shown in FIG. 5, the seventh video burst in the video stream, video burst 94a, corresponds to the seventh audio burst in the audio stream, audio burst 96a.

For each audio burst, or each group of audio bursts, the processor estimates the audio data volume "VA" downloaded by the UE. If TCP ACK numbers are unavailable, the processor's estimate of VA is based on the total data volume "XA" contained in the audio burst(s). For example, the processor may assume that VA=XA, or the processor may apply an appropriate adjustment to XA, e.g., by assuming that only 98%, or some other percentage, of XA was downloaded by the UE. As further described below, the processor also estimates the audio bit rate "RA." The processor then divides VA by RA, to arrive at the duration "DA" of downloaded audio (DA=VA/RA).

The processor also estimates the video data volume "VV" downloaded by the UE in the corresponding video burst or group of video bursts. Analogously to the processor's estimate of VA, if TCP ACK numbers are unavailable, the processor's estimate of VV may be based on the total data volume "XV" that was streamed to the UE in the video burst(s), i.e., VV=αXV, where a is a adjustment factor having a value of one or less. Since DA, the duration of downloaded audio, is also the duration of the corresponding downloaded video, the processor may then estimate the video bit rate "RV" by dividing VV by DA (RV=VV/DA). Subsequently, the processor may use RV to model the buffer data volume over time, as described above with reference to FIG. 4B, thus facilitating the calculation of the relevant performance metrics.

In some embodiments, the above estimation is performed separately for each pair of corresponding bursts. In other words, VV is separately estimated for each video burst, and VA is separately estimated for each audio burst, such that the bit rate is separately estimated for each video burst. Thus, for example, one bit rate may be estimated for a video burst 94a, another bit rate may be estimated for a video burst 94b, and yet another bit rate may be estimated for a video burst 94c.

In other embodiments, a sliding window is applied, such that the estimation is based on a plurality of groups of video bursts, and a plurality of corresponding groups of audio bursts. In other words, for each position of the sliding window, a total VV value is estimated for all of the video bursts in the sliding window, a total VA value is estimated for all of the audio bursts in the sliding window, and then a bit rate is estimated, based on the total VV and VA values. Such a sliding window may include any suitable number "N" of pairs of corresponding bursts. Typically, the estimated bit rate for each video burst is set as the average of the N bit rates that were estimated, respectively, for the N positions of the sliding window at which the video burst was included in the sliding window. An advantage of performing the estimation in this manner is that the estimation error may be reduced, relative to embodiments in which the bit rate is calculated separately for each corresponding pair of bursts.

FIG. 5 shows an example in which N=3. By way of illustration, a sliding window 98 is shown positioned over video bursts 94a-c, along with three corresponding audio bursts: audio burst 96a, another audio burst 96b, and yet another audio burst 96c.

In some cases, a single bit rate may be estimated for the entire video stream, based on a single total VV value for the entire video stream, and a single total VA value for the entire audio stream.

In some embodiments, machine-learning techniques are applied to the estimation of RA. The application of such techniques is facilitated by the fact that, as noted above, the audio is streamed at a constant bit rate that is selected from a small number of predefined options. For example, in some embodiments, the processor first learns a classifier that— based on features of an audio stream—identifies the bit rate of the audio stream. The processor then uses this classifier to estimate RA, i.e., the processor estimates RA as the bit rate that is returned by the classifier.

In other embodiments, the processor estimates RA by assuming a particular audio bit rate from the known predefined options. Since, typically, the predefined bit-rate options are relatively close to each other, an error in the estimation of RA is not likely to cause a significant error in the estimation of RV.

In general, a download of video, such as that depicted in graph 93, may take place over multiple successive flows. In some cases, for example, in response to a stall in the download, the UE may close the current flow, e.g., by sending a TCP Reset packet to the server, and open a new flow at a lower bit-rate. Hence, in some embodiments, the processor identifies a stall, in response to identifying that a new flow has begun at a lower bit-rate, and/or in response to identifying a TCP Reset packet. The flow to which each packet belongs may be identified, for a TCP packet, by the "5-tuple" contained in the packet, or, for packets communicated in accordance with other protocols, by any other analogous flow-identifying information.

In general, processor 48 may output any estimated quantities, such as bit rates and/or performance metrics, in any suitable manner. For example, processor 48 may display an output on a computer monitor or on any other suitable display, the output including the estimated quantities.

Although the embodiments described herein mainly address video streams, the methods and systems described herein can also be used in other applications, such as in bit extraction of audio and other types of media. Moreover, although the embodiments described herein refer mainly to encrypted streams, the disclosed techniques can also be used for measuring the media bit-rates of non-encrypted streams. For example, measuring the media bit-rate based on traffic pattern may be simpler and more computationally efficient than decoding the media content. Furthermore, since the disclosed techniques do not access the media content, they better protect user privacy.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A system, comprising:
a network interface; and
a processor, configured to:
monitor, via the network interface, (i) a streaming of an encrypted video stream, in a sequence of video bursts, from a video server to a user terminal, and (ii) a parallel streaming of an audio stream, in a sequence of audio bursts, from the video server to the user terminal,
based on the monitoring, and without decrypting or accessing content of the video stream:
differentiate between the video bursts and the audio bursts, using a machine-learned classifier,
identify an estimated encoding bit rate of the audio stream,
for a group of one or more of the audio bursts:
calculate an estimated volume of audio data, belonging to the group of the audio bursts, that is downloaded by the user terminal, and
calculate an estimated playback duration of the group of the audio bursts, by dividing the estimated volume of audio data by the estimated encoding bit rate of the audio stream,
identify, based on relative positions of the video bursts in the video stream and relative positions of the audio bursts in the audio stream, a group of the video bursts that corresponds to the group of the audio bursts,
calculate an estimated volume of video data, belonging to the group of the video bursts, that is downloaded by the user terminal, and
calculate an estimated bit rate at which the video stream was encoded, by dividing the estimated volume of video data by the estimated playback duration of the group of the audio bursts, and
output the estimated bit rate to an operator of a cellular communication network for performance of at least one network management function in the network responsively to the estimated bit rate, the function being selected from the group of functions consisting of: allocation of bandwidth, and application of a Quality-of-Service policy.

2. The apparatus according to claim 1, wherein the processor is further configured to calculate, using the estimated bit rate, a performance metric of the video stream, and to output the performance metric to the operator of the cellular communication network.

3. The apparatus according to claim 1, wherein the processor is configured to identify the group of the video bursts that corresponds to the group of the audio bursts by identifying a one-to-one correspondence between the video bursts and the audio bursts.

4. The apparatus according to claim 1, wherein the machine-learned classifier is a first machine-learned classifier, and wherein the processor is configured to identify the estimated encoding bit rate of the audio stream using a second machine-learned classifier.

5. The apparatus according to claim 1, wherein the processor is configured to identify the estimated encoding bit rate of the audio stream by selecting the encoding bit rate from a plurality of predefined bit rates.

6. The system according to claim 2, wherein the processor is configured to calculate the performance metric by:
using the estimated bit rate, calculating an estimated volume of data that was contained in a buffer of the user terminal during a playback of the video stream by the user terminal, and
calculating the performance metric, based on the estimated volume that was contained in the buffer.

7. The system according to claim 2, wherein the processor is configured to calculate the performance metric by identifying a stall in a playback of the video stream by the user terminal.

8. The system according to claim 2, wherein the processor is configured to calculate the performance metric by calculating an estimated start delay of a playback of the video stream by the user terminal.

9. A method, comprising:
using a processor, monitoring (i) a streaming of an encrypted video stream, in a sequence of video bursts, from a video server to a user terminal, and (ii) a parallel streaming of an audio stream, in a sequence of audio bursts, from the video server to the user terminal;
based on the monitoring, and without decrypting or accessing content of the video stream:
differentiating between the video bursts and the audio bursts, using a machine-learned classifier,
identifying an estimated encoding bit rate of the audio stream,
for a group of one or more of the audio bursts:
calculating an estimated volume of audio data, belonging to the group of the audio bursts, that is downloaded by the user terminal, and
calculating an estimated playback duration of the group of the audio bursts, by dividing the estimated volume of audio data by the estimated encoding bit rate of the audio stream,
identifying, based on relative positions of the video bursts in the video stream and relative positions of the audio bursts in the audio stream, a group of the video bursts that corresponds to the group of the audio bursts,
calculating an estimated volume of video data, belonging to the group of the video bursts, that is downloaded by the user terminal, and
calculating an estimated bit rate at which the video stream was encoded, by dividing the estimated volume of video data by the estimated playback duration of the group of the audio bursts; and
outputting the estimated bit rate to an operator of a cellular communication network for performance of at least one network management function in the network responsively to the estimated bit rate, the function being selected from the group of functions consisting of: allocation of bandwidth, and application of a Quality-of-Service policy.

10. The method according to claim 9, further comprising calculating, using the estimated bit rate, a performance metric of the video stream, and outputting the performance metric to the operator of the cellular communication network.

11. The method according to claim 9, wherein identifying the group of the video bursts that corresponds to the group of the audio bursts comprises identifying the group of the video bursts by identifying a one-to-one correspondence between the video bursts and the audio bursts.

12. The method according to claim 9, wherein the machine-learned classifier is a first machine-learned classifier, and wherein identifying the estimated encoding bit rate of the audio stream comprises identifying the estimated encoding bit rate of the audio stream using a second machine-learned classifier.

13. The method according to claim 9, wherein identifying the estimated encoding bit rate of the audio stream comprises identifying the estimated encoding bit rate of the audio stream by selecting the encoding bit rate from a plurality of predefined bit rates.

14. The method according to claim 10, wherein calculating the performance metric comprises:
   using the estimated bit rate, calculating an estimated volume of data that was contained in a buffer of the user terminal during a playback of the video stream by the user terminal; and
   calculating the performance metric, based on the estimated volume that was contained in the buffer.

15. The method according to claim 10, wherein calculating the performance metric comprises identifying a stall in a playback of the video stream by the user terminal.

16. The method according to claim 10, wherein calculating the performance metric comprises calculating an estimated start delay of a playback of the video stream by the user terminal.

* * * * *